(12) United States Patent
Kawamura

(10) Patent No.: US 8,031,288 B2
(45) Date of Patent: Oct. 4, 2011

(54) POLARIZATION CONVERSION ELEMENT, POLARIZED LIGHT ILLUMINATION OPTICAL ELEMENT, AND LIQUID CRYSTAL PROJECTOR

(75) Inventor: Yoshiji Kawamura, Sano (JP)

(73) Assignee: Fujinon Corporation, Saitama-Shi (JP)

( * ) Notice: Subject to any disclaimer, the term of this patent is extended or adjusted under 35 U.S.C. 154(b) by 322 days.

(21) Appl. No.: 12/475,180

(22) Filed: May 29, 2009

(65) Prior Publication Data

US 2009/0296008 A1    Dec. 3, 2009

(30) Foreign Application Priority Data

Jun. 3, 2008 (JP) .............................. P2008-145686
Dec. 22, 2008 (JP) .............................. P2008-325732

(51) Int. Cl.
*G02F 1/1343* (2006.01)
(52) U.S. Cl. ................. 349/55; 349/19; 349/33; 349/54; 349/61
(58) Field of Classification Search .................... 349/19, 349/33, 54, 55, 61
See application file for complete search history.

(56) References Cited

U.S. PATENT DOCUMENTS

| | | | | |
|---|---|---|---|---|
| 6,364,489 B1 * | 4/2002 | Eguchi | ............................. | 353/57 |
| 7,086,743 B2 * | 8/2006 | Yamakawa | ....................... | 353/70 |
| 2006/0221592 A1 * | 10/2006 | Nada et al. | ....................... | 362/29 |

FOREIGN PATENT DOCUMENTS

JP      2001-235624 A    8/2001

* cited by examiner

*Primary Examiner* — Jennifer Doan
(74) *Attorney, Agent, or Firm* — Birch, Stewart, Kolasch & Birch, LLP

(57) ABSTRACT

A prism sheet is bonded to the bottom faces of rectangular prisms constituting a polarization beam splitter array. In the front face of the prism sheet, a plurality of rectangular prism elements are arranged in parallel to each other and a phase difference compensation film is formed on the surface. The edge lines of the rectangular prism elements are inclined at 45 degrees relative to the edge lines of the rectangular prisms. Linear polarized light of S-polarization component reflected by a polarized light separation film is reflected twice sequentially in a phase difference compensation film formed in a pair of oblique faces of the rectangular prism elements, so that the polarization direction is rotated by 90 degrees and then the light reenters the rectangular prism. Then, the light is transmitted through the polarized light separation film and then extracted from the rectangular prism.

9 Claims, 6 Drawing Sheets

POLARIZATION CONVERSION ELEMENT, POLARIZED LIGHT ILLUMINATION OPTICAL ELEMENT, AND LIQUID CRYSTAL PROJECTOR

This application is based on and claims priority under 35 U.S.C §119 from Japanese Patent Application Nos. 2008-145686 and 2008-325732, filed on Jun. 3 and Dec. 22, 2008, respectively, the entire disclosure of which is herein incorporated by reference.

BACKGROUND OF THE INVENTION

1. Field of the Invention

The present invention relates to: a polarization conversion element for rotating by 90 degrees the polarization direction of linear polarized light having a fixed polarization direction; a polarized light illumination optical element for converting non-polarized illumination light into linear polarized light having a fixed polarization direction; and a liquid crystal projector whose illumination optical system employs these elements.

2. Description of Related Art

Various kinds of liquid crystal projectors are commercially available in which an image displayed on a liquid crystal display panel is illuminated by light from a light source lamp and then projected onto a screen. As known well, a liquid crystal display panel has: a liquid crystal layer of a thickness that encloses liquid crystal molecules; and a polarizer and an analyzer arranged on the incident surface side and the exit surface side, respectively. The polarizer and the analyzer are arranged in such a manner that their polarization directions are perpendicular or parallel to each other. Then, passage of linear polarized entering the liquid crystal layer is controlled in accordance with the orientation directions of the liquid crystal molecules, so that the amount of linear polarized light emitted through the analyzer is adjusted.

In the illumination optical system of such a liquid crystal projector, in general, a polarized light illumination optical element is employed that converts non-polarized light from a light source into linear polarized light having the same polarization direction as that of the polarizer of the liquid crystal display panel. As an example of this polarized light illumination optical element, as described in JP-A-2001-235624, a prism array is widely employed that is constructed from a combination of a polarization beam splitter and a ½-wavelength plate. Such a polarization beam splitter has a polarized light separation surface that transmits one of the two linear polarized light components whose polarization directions are perpendicular to each other, and that reflects the other component. Then, the polarization direction of one of the two linear polarized light components separated by this polarized light separation surface is rotated by 90 degrees through the ½-wavelength plate. After that, this linear polarized light component is mixed with the other linear polarized light component so that a linear polarized light component having an aligned polarization direction is obtained.

In a polarized light illumination optical element constructed from a combination of a polarization beam splitter and a ½-wavelength plate, when a glass prism or alternatively a heat resistive plastic material is employed for the polarization beam splitter while an inorganic dielectric multilayer film is employed for the polarized light separation surface, satisfactory heat resistance is ensured for these components. Nevertheless, since an organic sheet film is employed for the ½-wavelength plate, fading and a degradation in the polarization conversion efficiency are often arise when the optical element is used near a light source for a long time. For the purpose of heat resistance improvement, a crystalline material as such quartz having birefringence is proposed to be employed for the ½-wavelength plate. Nevertheless, the crystal itself is expensive. Further, the crystal need be machined under precise control of the crystalline optical axes. These situations cause an increase in the fabrication cost.

SUMMARY OF THE INVENTION

The present invention has been devised in view of the above-mentioned situation. An object of an illustrative, non-limiting embodiment of the present invention is to provide a polarization conversion element that serves as a functional element for rotating the polarization direction of linear polarized light by 90 degrees and can be employed in the above-mentioned polarized light illumination optical element, and that has satisfactory heat resistance and a suppressed fabrication cost. Another object of an illustrative, non-limiting embodiment of the present invention is to provide a polarized light illumination optical element that employs this polarization conversion element.

According to an aspect of the invention, there is provided a polarization conversion element that, when any one of first and second linear polarized light components whose polarization directions are perpendicular to each other enters therein, rotates a polarization direction thereof by 90 degrees so as to convert the linear polarized light component into the other linear polarized light component and emits the other linear polarized light component. The polarization conversion element includes a prism sheet in which a plurality of rectangular prism elements are arranged in such a manner that edge lines are aligned in parallel and in a plane. The polarization conversion element is disposed so that the edge lines are inclined at 45 degrees relative to the polarization direction of the one linear polarized light component. The one linear polarized light component incident through a bottom face of the prism sheet undergoes inner surface total reflection in each of a pair of oblique faces of each rectangular prism element and is thereby converted into the other linear polarized light component; and the other linear polarized light component obtained by the conversion exits through the bottom face of the prism sheet, in a direction opposite to the entering direction of the one linear polarized light component. Further, a dielectric multilayer film for compensating a reflection phase difference is formed on the pair of oblique faces, and the inner surface total reflection occurs at the interference between the dielectric multilayer film and air so that phase difference compensation is achieved for light in which internal reflection on the oblique face alone causes a phase difference between a light component having a first polarization direction and a light component having a second polarization direction.

Further, according to an aspect of the invention, there is provided a polarized light illumination optical element including a combination of the above-mentioned polarization conversion element and a polarization beam splitter. That is, the polarized light illumination optical element includes: a polarization beam splitter having a polarized light separation film in an interface between rectangular prisms so as to transmit one of first and second linear polarized light components whose polarization directions are perpendicular to each other among non-polarized light entering the polarized light separation film and to reflect the other linear polarized light component; and a polarization conversion element arranged in such a manner that a bottom face of the prism sheet opposes an exit surface of the polarization beam splitter from which the other linear polarized light component reflected by the polarized light separation film exits and that the edge lines are inclined at 45 degrees relative to the polarization direction of the other linear polarized light component. The other linear polarized light component entering the polarization conversion element undergoes the inner surface total reflection on each of the pair of oblique faces in each of the rectangular prism elements so that the other linear polarized light component is converted into the one linear polarized light component and the converted linear polarized light reenters the polarization beam splitter. As a result, this linear polarized light can be extracted from the polarization beam splitter through the polarized light separation film.

Further, in the above-mentioned polarized light illumination optical element, such a configuration may be employed that the polarized light separation film is provided in each of a pair of oblique faces of the rectangular prisms and that the other linear polarized light component reflected by the polarized light separation film on one of the pair of oblique faces is re-reflected by the polarized light separation film on the other of the pair of oblique faces and then exits from the bottom faces of the rectangular prisms. In this case, the polarization conversion element is provided in one of two areas into which the bottom faces of the rectangular prisms are divided by a line parallel to the edge lines of the rectangular prisms. Further, it is also effective that a gap is provided between the bottom faces of the rectangular prisms and the polarization conversion element, and the end face of the prism sheet is mirror-polished to provide a phase difference compensation film on the polished surface. An aspect of the present invention includes that a plurality of these polarization beam splitters are aligned in the form of an array and a polarization conversion element is provided in one of two areas into which the bottom face of each rectangular prism is divided by a line.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

According to an exemplary embodiment of the present invention, a polarization conversion element is obtained that has satisfactory heat resistance and a suppressed fabrication cost. Then, when first one of first and second linear polarized light components whose polarization directions are perpendicular to each other enters in the polarization conversion element, this linear polarized light component can efficiently be converted into a second linear polarized light component. Further, when this polarization conversion element is combined with a beam splitter array, for example, non-polarized light emitted from a light source can efficiently be converted into linear polarized light in a state almost completely without light leakage in comparison with the prior art apparatus. Thus, a polarized light illumination optical element suitable for a liquid crystal projector or the like is obtained.

Hereinafter, exemplary embodiments of the invention will be described in detail by reference to the accompanying drawings.

Figure 1:
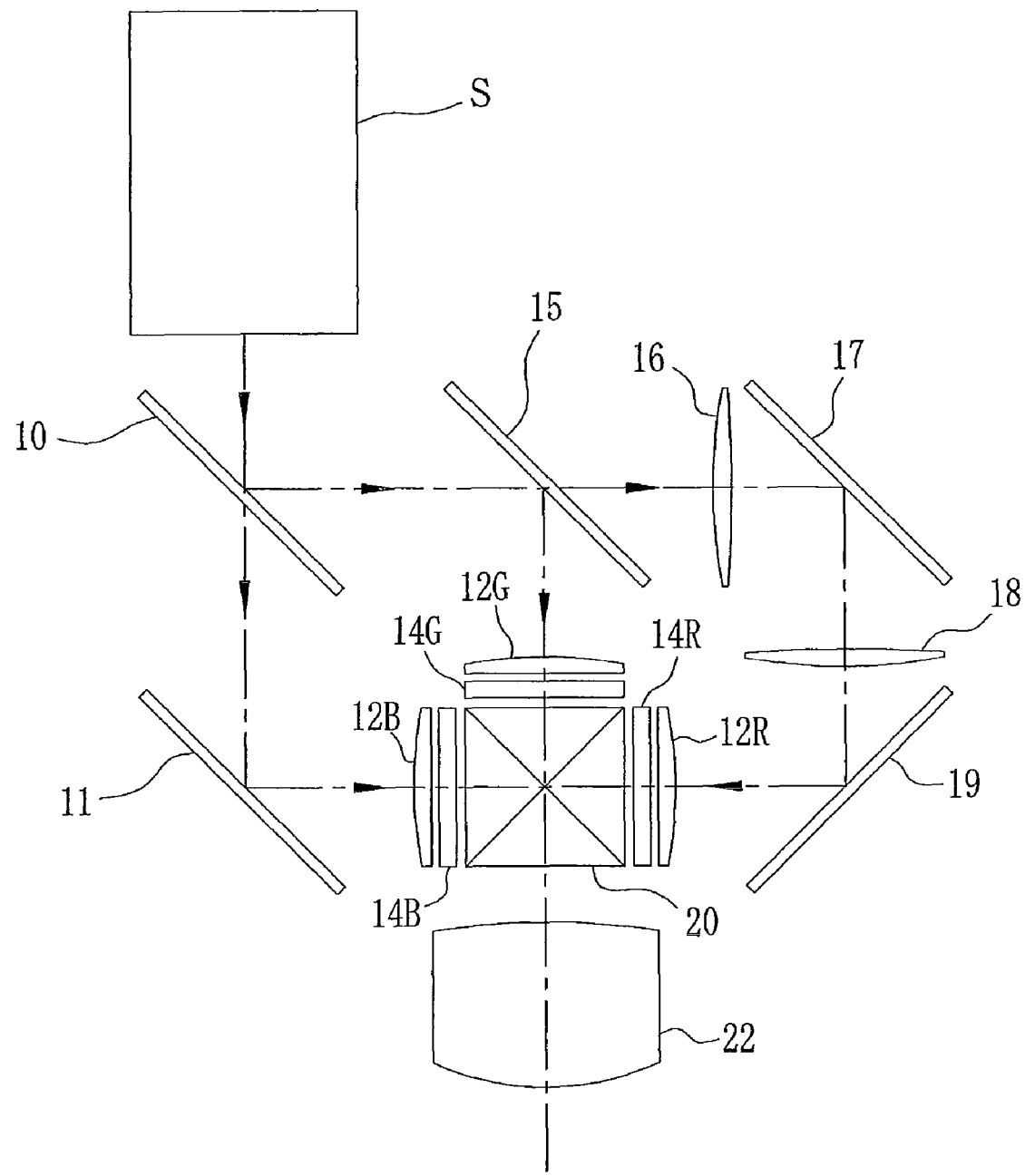
FIG. 1 is a schematic diagram showing a main part of an illumination optical system of a liquid crystal projector.
Figure 2:
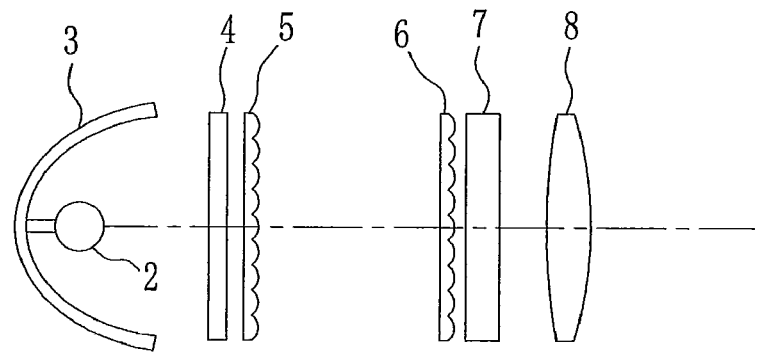
FIG. 2 is a schematic diagram showing a main part of a light source apparatus of a liquid crystal projector.

An optical system of a liquid crystal projector, together with a light source apparatus S, is schematically constructed as shown in FIG. 1. As shown in FIG. 2, the light source apparatus S is provided with a high-luminance light source lamp 2 such as an extra-high pressure mercury lamp, and is used together with a reflector 3. In the course of the illumination optical path, a filter 4 for infrared and ultraviolet cut-off is provided. Non-polarized and visible-range illumination light including various polarized light components enters a first lens array 5 in the form of an approximately parallel light beam. The first lens array 5 has a structure that a plurality of segment lenses are arranged in the form of a rectangular matrix array such as to follow the rectangle of the liquid crystal display panel. As a result, pseudo light sources in a number equal to the number of segment lenses are equivalently formed onto a second lens array 6 having a similar structure.

The illumination light from the pseudo-light source formed on the second lens array 6 enters a polarized light illumination optical element 7 with a small incident angle of 5° to 6° or the like even for peripheral light. The polarized light illumination optical element 7 has an operational function of separating a linear polarized light component having a polarization direction perpendicular to this page from among the non-polarized illumination light containing various polarized light components, and then causes the separated light component to enter an illumination lens 8. The illumination lens 8 guides and superposes the illumination light from the individual pseudo-light sources converted into linearly polarized light and emitted from the polarized light illumination optical element 7, onto the entirety of the effective screen are of the liquid crystal display panel provided for each of the B (blue light) channel, the G (green light) channel, and the R (red light) channel. As a result, the liquid crystal display panel of each channel is illuminated uniformly.

As shown in FIG. 1, the illumination light emitted from the light source apparatus S through the illumination lens 8 first enters a dichroic mirror 10 so that blue light is transmitted while the other colored light components are reflected. The blue light enters a field lens 12B via a total reflection mirror 11. On the field lens 12B, the light beam from the pseudo-light source is superposed by virtue of the operational function of the illumination lens 8, and then uniformly illuminates the effective screen area of a liquid crystal display panel 14B provided behind. Further, among the colored light components reflected by the dichroic mirror 10, green light is reflected by the next dichroic mirror 15, and then similarly illuminates uniformly a liquid crystal display panel 14G via a field lens 12G.

Red light transmitted by the dichroic mirror 15 is guided through a first relay lens 16, a total reflection mirror 17, a second relay lens 18, and a total reflection mirror 19 to a field lens 12R, and then similarly illuminates uniformly a liquid crystal display panel 14R from the behind. The illumination optical path length of the R channel is longer than those of the B and the G channels. Thus, if no countermeasure were employed, the operational function of the illumination lens 8 would be lost in the R channel. However, the first and the second relay lenses 16 and 18 are employed so that the operational function of the illumination lens 8 is similarly maintained also in the R channel.

By virtue of the field lenses 12B, 12G, and 12R, the liquid crystal display panels 14B, 14G, and 14R are uniformly illuminated by the linearly polarized illumination light from the behind without degradation even in the amount of peripheral light. Then, the image light for each channel having passed through each of the liquid crystal display panels 14B, 14G, and 14R is combined by a cross dichroic prism 20, then enters a projector lens 22 in the form of full color image light, and is then projected toward a screen.

Figure 3:
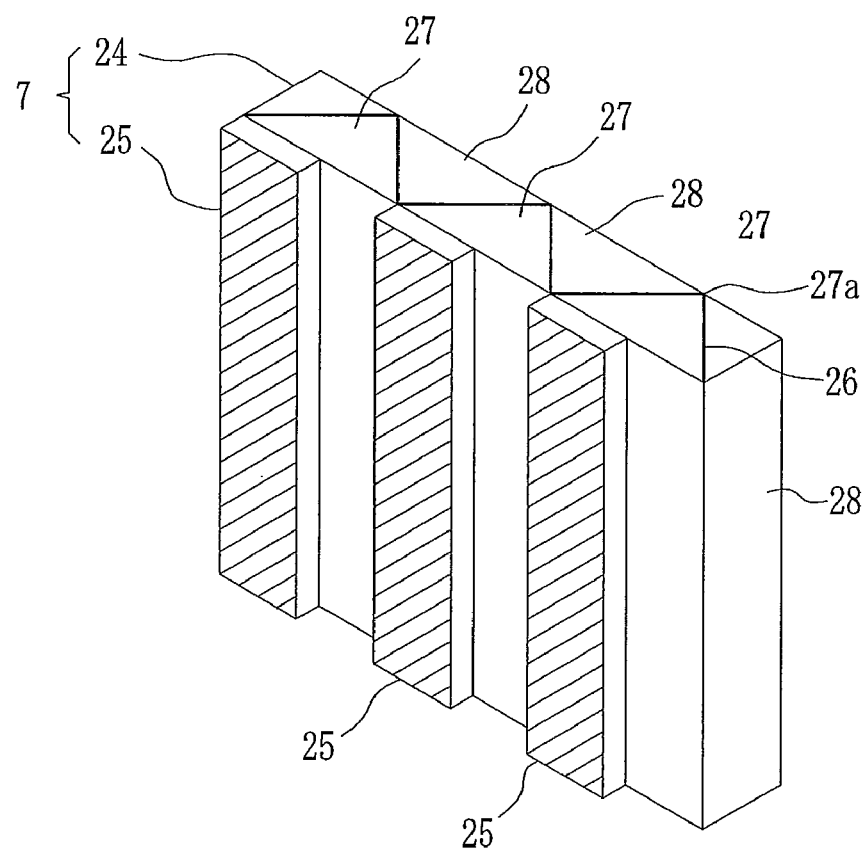
FIG. 3 is an external appearance view of a polarized light illumination optical element.

As shown in FIG. 3, the polarized light illumination optical element 7 employed in the light source apparatus S has an external appearance of an approximately rectangular shape, and constructed from a polarization beam splitter array 24 and a prism sheet 25 bonded to its light incidence face side. In the polarization beam splitter array 24, rectangular prisms 27 in each of which a polarized light separation film 26 including a dielectric multilayer film is formed on each of a pair of oblique faces are arranged adjacent to each other in such a manner that the edge lines 27a are aligned in parallel to each other and in a plane. Further, rectangular prisms 28 having the same shape are bonded in such a manner that the depressions and protrusions on the behind are complemented. From among the illumination light components having entered almost perpendicularly through the bottom faces of the rectangular prisms 27 and then entered the polarized light separation film 26 at approximately 45 degrees, the polarized light separation film 26 transmits linear polarized light of P-polarization component (having a polarization direction parallel to a plane containing the normal to the polarized light separation film 26 and the incident beam), and reflects linear polarized light of S-polarization component (having a polarization direction perpendicular to that of the linear polarized light of P-polarization component).

Figure 4:
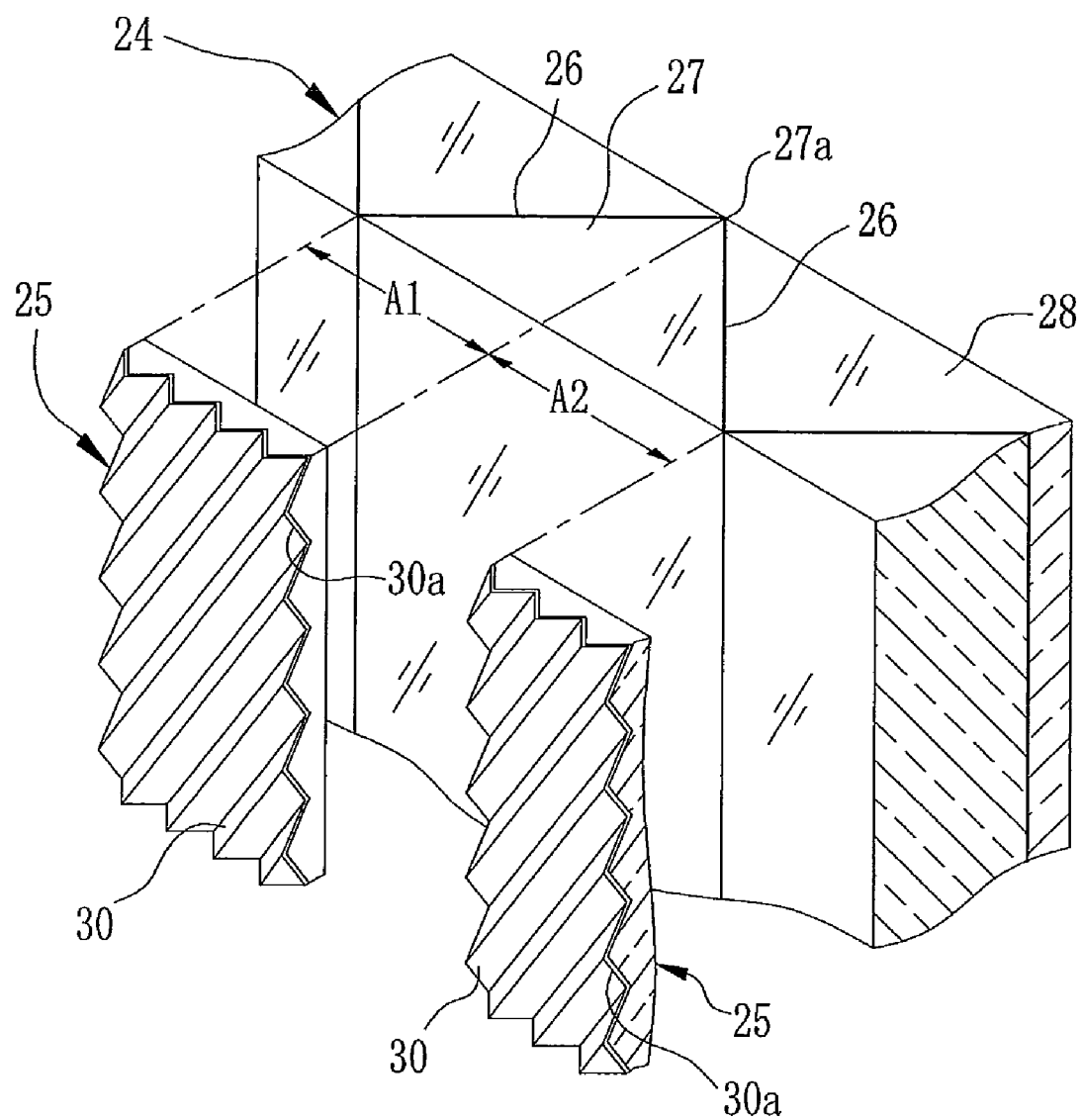
FIG. 4 is a partly removed perspective view showing a structure of a polarized light illumination optical element.

As shown in the enlarged part view of FIG. 4, the prism sheet 25 is a thin-strip-shaped sheet bonded to the bottom face of each rectangular prism 27 constituting the polarization beam splitter array 24, and hence can be fabricated from a transparent plastic or glass material. In the prism sheet 25, as shown in the figures, a plurality of rectangular prism elements 30 are arranged in such a manner that the edge lines are aligned in parallel to each other and in a plane. Further, each of the rectangular prism elements 30 is located such as to cover one area A1 selected from two areas into which the bottom faces of the rectangular prisms 27 are divided by a line parallel to the edge line 27a. Further, the other area A2 in the divided bottom faces of the rectangular prisms 27 are directly exposed to the outside. Here, when the part covering the other area A2 is in the form of a parallel plane, the plurality of thin-strip-shaped prism sheets 25 may be in a form integrated to each other.

Figure 5:
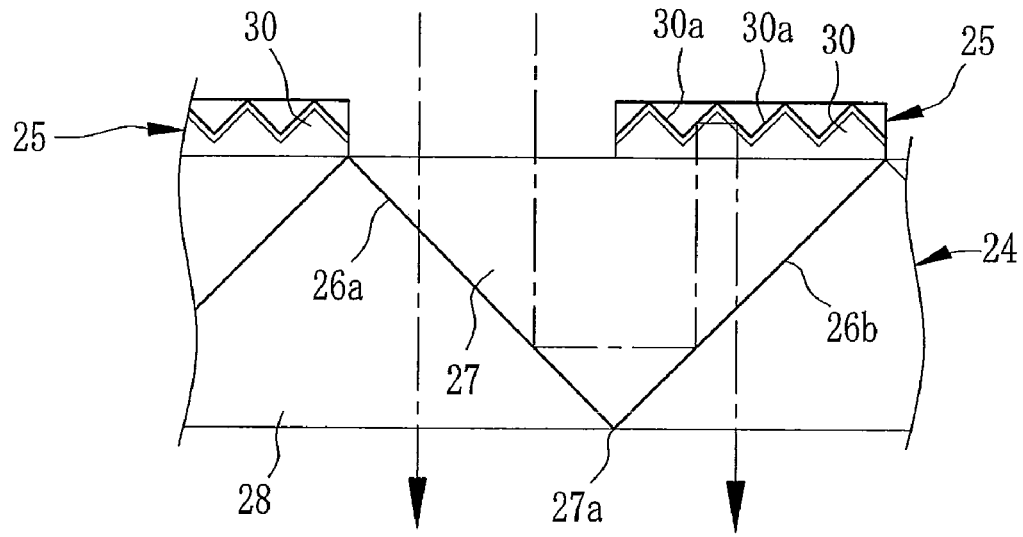
FIG. 5 is an operation explanation diagram for a polarized light illumination optical element.

The individual edge lines of rectangular prism elements 30 constituting the prism sheet 25 are inclined at 45 degrees relative to the edge lines 27a of the rectangular prisms 27. As shown in FIG. 5, a phase difference compensation film 30a including a dielectric multilayer film is formed on the surface. When the linear polarized light of S-polarization component reflected by the polarized light separation film 26 of the rectangular prism 27 exits from the bottom face of the rectangular prism 27 and then enters the oblique face of the rectangular prism element 30, a phase difference is generated in the inner surface total reflection in the pair of oblique faces alone because the polarization direction of the linear polarized light of S-polarization component is inclined at the angle of 45 degrees relative to the edge lines of the rectangular prism element 30. Thus, the phase difference compensation film 30a is provided in order to compress this phase difference. Accordingly, when a loss in the inner surface total reflection in the rectangular prism element 30 is acceptable, the phase difference compensation film 30a may be omitted.

As described above, the linear polarized light of S-polarization component that enters the rectangular prism element 30 undergoes inner surface total reflection twice on a pair of oblique faces of the rectangular prism element 30, so that the optical path is inverted by 180 degrees while the polarization direction is rotated by 90 degrees. Thus, when reentering the polarized light separation film 26 from the bottom face of the rectangular prism 27, this light is converted into linear polarized light of P-polarization component. Nevertheless, a phase difference arises in the linear polarized light of S-polarization component during the two times of inner surface total reflection, and hence perfect linear polarized light of P-polarization is not obtained that has a uniform polarization direction. That is, linear polarized light is obtained that partly contains light having deviation in the polarization direction. Thus, in the linear polarized light of P-polarization component that reenters through the bottom face of the rectangular prism 27 and then passes through the polarized light separation film 26, the part of approximately 20% to 30% is lost.

Figure 6:
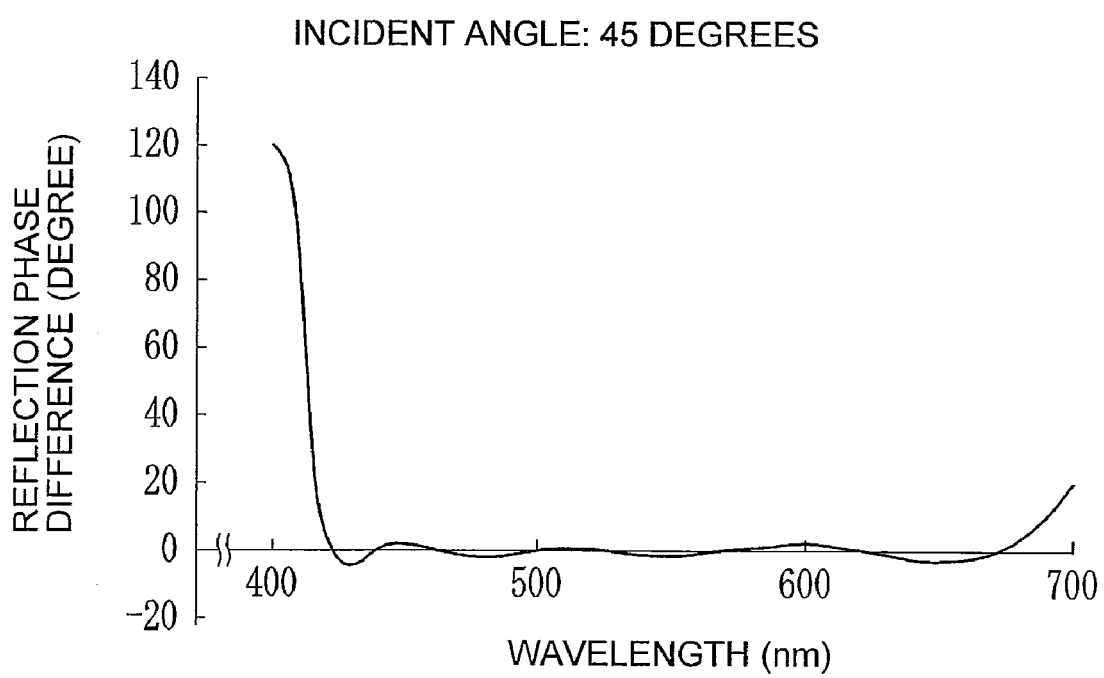
FIG. 6 is a graph showing compensation characteristics of a phase difference compensation film.

In contrast, the above-mentioned phase difference compensation film 30a has compensation characteristics shown in FIG. 6. Thus, satisfactory phase difference compensation is performed almost over the entire visible range. Thus, even when the linear polarized light of S-polarization component having entered the rectangular prism element 30 has a polarization direction of 45 degrees relative to the edge lines of the rectangular prism element 30, satisfactory phase difference compensation is achieved during the two times of internal reflection in the phase difference compensation film 30a. Then, this light reenters the rectangular prism 27 as linear polarized light of P-polarization component almost without a loss. Here, an example of the phase difference compensation film 30a is realized by a film configuration shown in Table 1.

TABLE 1

| Layer No. | Material | Refractive index (n) | Film thickness (d) nm | ($\lambda$ = 510 nm) Optical film thickness (nd/$\lambda$) |
|---|---|---|---|---|
| Base material | BK7 | 1.52083 | | |
| 1 | TiO$_2$ | 2.34867 | 15.02 | 0.0692 |
| 2 | SiO$_2$ | 1.4618 | 38.05 | 0.1091 |
| 3 | TiO$_2$ | 2.34867 | 107.22 | 0.4938 |
| 4 | SiO$_2$ | 1.4618 | 35.03 | 0.1004 |
| 5 | TiO$_2$ | 2.34867 | 7.47 | 0.0344 |
| 6 | SiO$_2$ | 1.4618 | 196.17 | 0.5623 |
| 7 | TiO$_2$ | 2.34867 | 110.89 | 0.5107 |
| 8 | SiO$_2$ | 1.4618 | 181.19 | 0.5193 |
| 9 | TiO$_2$ | 2.34867 | 79.52 | 0.3662 |
| 10 | SiO$_2$ | 1.4618 | 29.57 | 0.0848 |
| Air | Air | 1 | | |

The phase difference compensation film 30a having the film configuration shown in Table 1 is fabricated in the form of alternating layers of two kinds of materials TiO$_2$ and SiO$_2$ which are widely employed as dielectric film materials. This realizes a low fabrication cost. Here, the film configuration of the reflective phase difference compensation film 30a is not limited to this example. That is, various kinds of thin film materials may be employed as long as they are transparent. Further, the number of stacked layers, the film thickness values, and the like may be set up appropriately depending on the thin film design.

The operation of the polarized light illumination optical element 7 is described below. Non-polarized illumination light composed of approximately parallel light beams emitted from the individual micro lenses constituting the second micro lens array 6 enters the polarized light illumination optical element 7 for each micro lens. As shown in FIG. 5, the illumination light that has exited from the micro lens and then entered the polarization beam splitter array 24 without passing through the prism sheet 25 passes through the area A2 of the bottom face of the rectangular prism 27 and then enters the polarized light separation film 26a at an incident angle of 45 degrees.

The polarized light separation film 26a transmits linear polarized light of P-polarization component contained in the entering illumination light, and reflects linear polarized light of S-polarization component into an angle of 45 degrees. The transmitted linear polarized light of P-polarization component directly passes through the rectangular prism 28, and then exits from the polarization beam splitter array 24. Further, the reflected linear polarized light of S-polarization component is reflected again by the other polarized light separation film 26b that opposes at a vertical angle of 90, and then exits from the area A1 of the bottom face of the rectangular prism 27 toward the prism sheet 25.

This linear polarized light is composed of an S-polarization component having a polarization direction (plane of polarization) perpendicular to the page. Then, when this light enters the rectangular prism element 30 whose edge lines are inclined at 45 degrees relative to the polarization direction, the polarization direction is rotated by 90 degrees during the inner surface total reflection in the phase difference compensation film 30a formed in the pair of oblique faces. Thus, this light enters the other polarized light separation film 26b of the rectangular prism 27 in the form of linear polarized light of P-polarization component having a polarization direction parallel to the page. Accordingly, this linear polarized light transmits the polarized light separation film 26b, and then used as illumination light of the liquid crystal display panel together with the linear polarized light of P-polarization component having passed through the polarized light separation film 26a.

As described above, when this polarized light illumination optical element 7 is employed, linear polarized light of P-polarization component can be extracted from non-polarized illumination light emitted from a light source, almost without a loss. This permits efficient illumination of a liquid crystal display panel. Here, even when the phase difference compensation film 30a is omitted, the loss is still low. Thus, a lower cost type is also available.

The prism sheet 25 employed in the polarized light illumination optical element 7 is used as a polarization conversion element for rotating the polarization direction of linear polarized light by 90 degrees similarly in a ½-wavelength plate. However, in contrast to a ½-wavelength plate employed in the prior art, this polarization conversion element can be fabricated from a glass or plastic material having satisfactory heat resistance, and hence has sufficient durability even when used in a high temperature environment like in the vicinity of the light source of a liquid crystal projector. Here, a metal film having a high reflectivity may be formed on the outer surface of the rectangular prism element 30, so that the polarization direction may be rotated by 90 degrees by surface reflection. Nevertheless, a surface reflection mirror composed of a metal film cannot achieve a sufficiently high reflectivity both of its characteristics. Thus, when inner surface total reflection in the pair of oblique faces of the rectangular prism element 30 or in the phase difference compensation film 30a is employed, the efficiency of light utilization is improved, and remarkably high durability is obtained.

Figure 7:
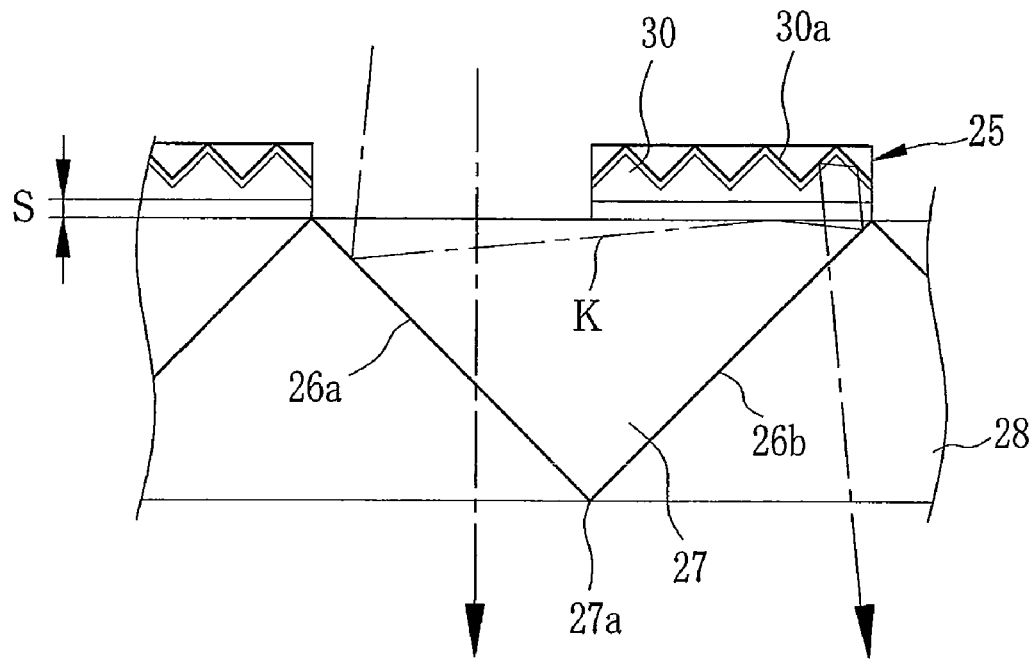
FIG. 7 is an operation explanation diagram for another embodiment of a polarized light illumination optical element.

FIG. 7 shows a modification in an embodiment of the present invention. In this embodiment, an air gap S of approximately 0.1 mm is provided between the bottom face of the rectangular prism 27 and the prism sheet 25. Illumination light from the segment lens in the second lens array 6 shown in FIG. 2 is not completely parallel to the optical axis. That is, a part of light beams enter through the bottom face of the rectangular prism 27 with an inclination of 5° or the like as shown in FIG. 7 as indicated by symbol M. Thus, in some cases, linear polarized light K of S-polarization component reflected by the polarized light separation film 26a reaches the bottom face of the rectangular prism 27 without entering first the other polarized light separation film 26b.

In this case, if the prism sheet 25 were bonded to the bottom face of the rectangular prism 27 with adhesives having a refractive index similar to that of the rectangular prism 27, the linear polarized light K would enter the prism sheet 25 at a large incident angle, and then be lost without reentering the rectangular prism 27. In contrast, when the air gap S is provided, the linear polarized light K undergoes inner surface total reflection in the bottom face of the rectangular prism 27, and then enters the other polarized light separation film 26b. Then, after being reflected by the polarized light separation film 26b, the light exits from the area A1 of the rectangular prism 27 toward the prism sheet 25, and is then reflected by the rectangular prism element 30 so as to return to the rectangular prism 27. This further improves the utilization efficiency of the illumination light. The air gap S is formed merely by inserting an appropriate spacer between the bottom face of the rectangular prism 27 and the prism sheet 25.

Here, for the purpose of improvement of the inner surface total reflection of the linear polarized light K in the bottom face of the rectangular prism 27, the bottom face of the rectangular prism 27 may contact with a low-refractive-index layer having a lower refractive index than the rectangular prism 27. Thus, in place of providing the air gap S as described above, a dielectric layer such as an $MgF_2$ or $SiO_2$ layer having a low refractive index may be formed on the bottom face of the rectangular prism 27. Alternatively, the prism sheet 25 may be bonded to the bottom face of rectangular prism 15 with adhesives such as silicon resin having a lower refractive index than the rectangular prism 27.

Figure 8:
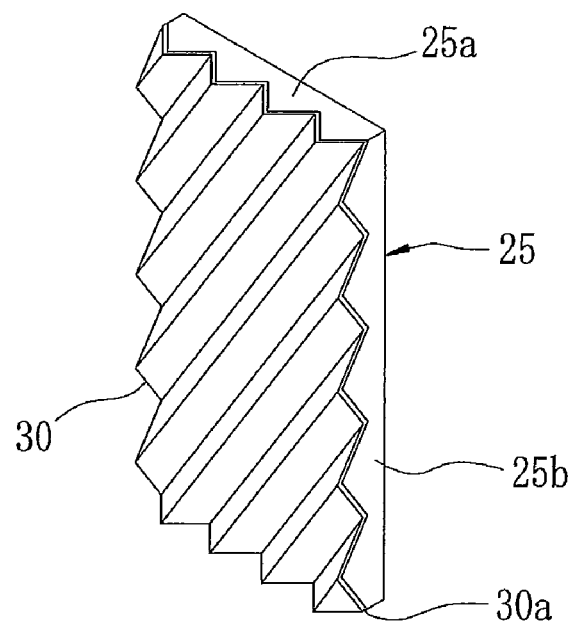
FIG. 8 is a perspective view showing another example of a prism sheet.

For the purpose of further improvement of the utilization efficiency of the light in the polarized light illumination optical element 7, as shown in FIG. 8, the individual end faces 25a and 25b constituting the outer periphery of the prism sheet 25 may be mirror-finished and, at the same time, the individual end faces 25a and 25b may be provided with the phase difference compensation film 30a formed in the surface of the rectangular prism element 30. As described above, in an illumination optical system that employs a pair of so-called fly eye lenses like the first and the second lens arrays 5 and 6, a part of light beams that enter the rectangular prism 27 have finite incident angles and various directional angles. Thus, a part of light beams that exit from the rectangular prism 27 and then enter the prism sheet 25 go toward the end faces 25a and 25b of the prism sheet 25. When the end faces 25a and 25b are mirror-polished, almost the entirety of such light beams undergo inner surface total reflection so as to return to the prism sheet 25, and are then used as illumination light. Further, leakage of unnecessary light from the prism sheet 25 is avoided, while stray light in the illumination optical system of the liquid crystal projector is suppressed so that an effect of improving the image contrast is obtained.

Here, when the utilization efficiency alone of the illumination light is to be improved, the phase difference compensation film 30a on the end faces 25a and 25b may be omitted. However, when the phase difference compensation film 30a is formed in the same film configuration as that formed on the end faces 25a and 25b on the surface of the rectangular prism element 30 like in the present embodiment, the liquid crystal display panel can be illuminated by P-polarized light having more uniform phase in comparison with a case that illumination light obtained by the inner surface total reflection alone in the end faces 25a and 25b is employed. This improves the image contrast further.

Figure 9:
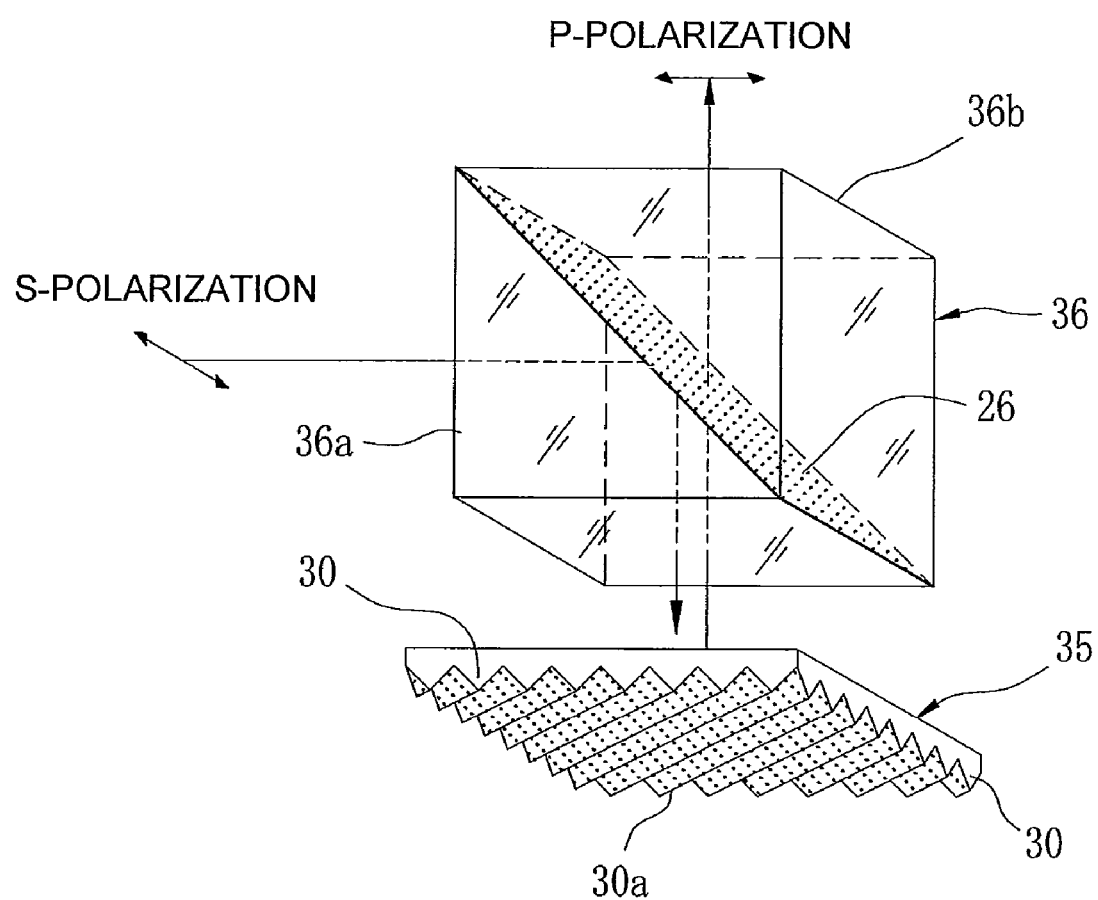
FIG. 9 is a conceptual diagram showing another embodiment that employs a polarization conversion element of the present invention.

FIG. 9 shows an example that the prism sheet 25 is employed as a polarization conversion element 35. On the oblique faces of the rectangular prism element 30 constituting the polarization conversion element 35, a phase difference compensation film 30a is formed similarly to the embodiment described above. In the polarization beam splitter 36, the bottom faces of rectangular prisms 36a and 36b having the same size are bonded to each other. One of these bottom faces is provided with a polarized light separation film 26.

When linear polarized light of S-polarization component obtained by a well-known technique enters through the entering surface of the prism 36a, the light is reflected perpendicularly downward by the polarized light separation film 26, and then enters the polarization conversion element 35 through the exit surface of the prism 36a. Then, the light undergoes two times of inner surface total reflection in the phase difference compensation film 30a formed in the pair of oblique faces of the rectangular prism element 30 constituting the polarization conversion element 35, so that the polarization direction is rotated by 90 degrees. Then, the light is returned to the prism 36a through the exit surface. The reentering linear polarized light has already been converted into linearly polarized light of P-polarization component relative to the polarized light separation film 26. Thus, the linear polarized light is transmitted through the polarized light separation film 26, and then extracted as linear polarized light of P-polarization component from the exit surface of beam splitter 36.

In addition to the technical field of liquid crystal projectors, in technical fields where linear polarized light is to be treated, situations arise that the polarization direction need be rotated by 90 degrees depending on the application. Even in such cases, the above-mentioned polarization conversion element 35 may be employed together with the beam splitter 36. Here, in FIG. 9, in place of the linear polarized light of S-polarization component that enters the prism 36, non-polarized light may be employed. In this case, linear polarized light of P-polarization component having been transmitted through the polarized light separation film 26 can be extracted in addition to the linear polarized light of P-polarization component shown in the figure. Thus, this apparatus can be employed also as an optical system for efficiently extracting linear polarized light of P-polarization component from non-polarized light.

What is claimed is:

1. A polarization conversion element that rotates a polarization direction of first linear polarized light of incident light by 90 degrees so as to convert the first linear polarized light component into second linear polarized light component and emits the second linear polarized light component, the first and second linear polarized light having polarization directions perpendicular to each other, the polarization conversion element comprising a prism sheet including a plurality of rectangular prism elements arranged in such a manner that edge lines of the rectangular prism elements are aligned in parallel and in a plane, the prism sheet being disposed so that the edge lines are inclined at 45 degrees relative to the polarization direction of the first linear polarized light component, wherein the first linear polarized light component incident through a bottom face of the prism sheet undergoes inner surface total reflection on each of a pair of oblique faces in each of the rectangular prism elements so as to be converted into the second linear polarized light component, and the converted second linear polarized light component exits from the bottom face of the prism sheet in a direction opposite to an incident direction of the first polarized light component.

2. The polarization conversion element according to claim 1, wherein a dielectric multilayer film for compensating a reflection phase difference is formed on the pair of oblique faces, and the inner surface total reflection occurs in the dielectric multilayer film so that the second linear polarized light component exits.

3. A polarized light illumination optical element comprising:
a polarization beam splitter including rectangular prisms and a polarized light separation film in an interface between the rectangular prisms, the polarization beam splitter reflecting first linear polarized light component of non-polarized incident light and transmitting second linear polarized light component of the non-polarized incident light, the first and second linear polarized light components having polarization directions perpendicular to each other; and
a polarization conversion element according to claim 1 disposed so that a bottom face of the prism sheet opposes an exit surface of the polarization beam splitter from which the first linear polarized light component reflected by the polarized light separation film exits and that the edge lines of the rectangular prism elements are inclined at 45 degrees relative to the polarization direction of the first linear polarized light component,
wherein the first linear polarized light component entering the polarization conversion element undergoes the inner surface total reflection on each of the pair of oblique faces in each of the rectangular prism elements so as to be converted into the second linear polarized light component, and the converted second linear polarized light reenters the polarization beam splitter and exits from the polarization beam splitter through the polarized light separation film.

4. The polarized light illumination optical element according to claim 3, wherein
polarized light separation film is provided on each of a pair of oblique faces in each of the rectangular prisms,
the first linear polarized light component reflected by the polarized light separation film on one of the pair of oblique faces of the rectangular prisms is re-reflected by the polarized light separation film on the other of the pair of oblique faces of the rectangular prisms and exits from bottom faces of the rectangular prisms, and
the polarization conversion element is provided in one of two areas into which the bottom faces of the rectangular prisms are divided by a line parallel to the edge lines of the rectangular prisms.

5. The polarized light illumination optical element according to claim 4, wherein a low-refractive-index layer is provided between the bottom faces of the rectangular prisms and the polarization conversion element.

6. The polarized light illumination optical element according to claim 4, wherein a plurality of polarization beam splitters are aligned in such a manner that the edge lines of rectangular prisms are aligned in parallel and in a plane; and the polarization conversion element is provided on a bottom face of each of the rectangular prisms.

7. The polarized light illumination optical element according to claim 6, wherein each end face constituting an outer periphery of the polarization conversion element is mirror-polished.

8. The polarized light illumination optical element according to claim 7, wherein a dielectric multilayer film for compensating a reflection phase difference is formed on the end face, and the inner surface total reflection occurs in the dielectric multilayer films so that a phase difference generated in an incident linear polarized light is compensated.

9. A liquid crystal projector comprising an illumination optical system including a light source, a pair of micro lens arrays each including a plurality of micro lens arranged, a polarized light illumination element according to claim 3 provided immediately after an exit surface of the pair of micro lens array, and a liquid crystal display panel,
wherein illumination light from the light source lamp is divided into illumination light components at the pair of micro lens arrays, and the divided illumination light components are superposed with each other on the liquid crystal display panel.

* * * * *